US008670309B2

(12) United States Patent
Atkinson et al.

(10) Patent No.: US 8,670,309 B2
(45) Date of Patent: Mar. 11, 2014

(54) METHOD AND APPARATUS FOR PREVENTING ACTIVATION OF A CONGESTION CONTROL PROCESS

(75) Inventors: Gary W. Atkinson, Freehold, NJ (US); Ramesh Nagarajan, West Windsor, NJ (US); Shyam P. Parekh, Orinda, CA (US)

(73) Assignee: Alcatel Lucent, Paris (FR)

( * ) Notice: Subject to any disclaimer, the term of this patent is extended or adjusted under 35 U.S.C. 154(b) by 2584 days.

(21) Appl. No.: 11/239,765

(22) Filed: Sep. 30, 2005

(65) Prior Publication Data
US 2007/0076598 A1    Apr. 5, 2007

(51) Int. Cl.
*H04L 12/26*    (2006.01)
(52) U.S. Cl.
USPC .......................................... 370/230; 370/465
(58) Field of Classification Search
None
See application file for complete search history.

(56) References Cited

U.S. PATENT DOCUMENTS

| 6,757,248 | B1* | 6/2004 | Li et al. ........................ 370/235 |
| 6,990,069 | B1* | 1/2006 | Ramakrishnan .............. 370/229 |
| 7,277,390 | B2* | 10/2007 | Kang ............................ 370/231 |
| 2002/0194361 | A1* | 12/2002 | Itoh et al. ..................... 709/233 |
| 2003/0137948 | A1* | 7/2003 | Komandur et al. .......... 370/315 |
| 2004/0264366 | A1* | 12/2004 | Swami ......................... 370/229 |
| 2006/0029037 | A1* | 2/2006 | Chen et al. ................... 370/351 |
| 2006/0198341 | A1* | 9/2006 | Singh et al. .................. 370/331 |
| 2006/0253622 | A1* | 11/2006 | Wiemann et al. ............... 710/52 |
| 2006/0268933 | A1* | 11/2006 | Kellerer et al. .............. 370/469 |
| 2007/0086335 | A1* | 4/2007 | McCanne et al. ............ 370/229 |
| 2008/0037420 | A1* | 2/2008 | Tang ............................ 370/229 |
| 2008/0267070 | A1* | 10/2008 | Mannal et al. ............... 370/235 |
| 2009/0006920 | A1* | 1/2009 | Munson et al. .............. 714/748 |

* cited by examiner

*Primary Examiner* — Rhonda Murphy
(74) *Attorney, Agent, or Firm* — Wall & Tong, LLP

(57) ABSTRACT

The invention comprises a method and apparatus that prevents the activation of a congestion controlling process that would otherwise be activated in response any packet loss condition. The congestion controlling process is inhibited when a congestion parameter associated indicates that the packet loss condition is not caused by congestion.

2 Claims, 4 Drawing Sheets

METHOD AND APPARATUS FOR PREVENTING ACTIVATION OF A CONGESTION CONTROL PROCESS

FIELD OF INVENTION

The invention relates to the field of communication networks, and, more specifically, to controlling congestion in communication networks.

DESCRIPTION OF THE BACKGROUND ART

Transmission Control Protocol (TCP) is a common transport layer protocol used for controlling packet loss by using end-to-end retransmission of lost packets. In many networks, such as traditional Internet Protocol (IP) networks, packet loss is more commonly caused by conditions that occur as a result of congestion, e.g., buffer overflows, link over-utilization, and the like, rather than other failures that are not the result of congestion, e.g., bit errors, link errors, and the like. As such, TCP congestion control mechanisms were designed based on the idea that all packet loss is indicative of congestion.

Since TCP assumes that all packet losses are caused as a result of congestion, in response to all packet losses, TCP implements processes to control congestion, such as reducing a congestion window size. Unfortunately, since not all packet losses are due to congestion, TCP incorrectly attempts to control congestion in response to both packet loss caused by congestion, as well as packet loss not caused by congestion. Disadvantageously, use of congestion control when packet loss is not caused by congestion results in underutilized networks, decreased network throughput, and poor end-to-end network performance.

SUMMARY OF THE INVENTION

The present invention prevents the activation of a congestion controlling process that would otherwise be activated in response any packet loss condition. The congestion controlling process is inhibited in the absence of congestion related packet drop conditions. Specifically, the invention distinguishes between congestion related packet drop conditions (e.g., buffer overflows, link over-utilization, and the like) and non-congestion related packet drop conditions (e.g., bit errors, link errors, and the like). Advantageously, network throughput is increased, network utilization is increased, and end-to-end network performance is significantly improved.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
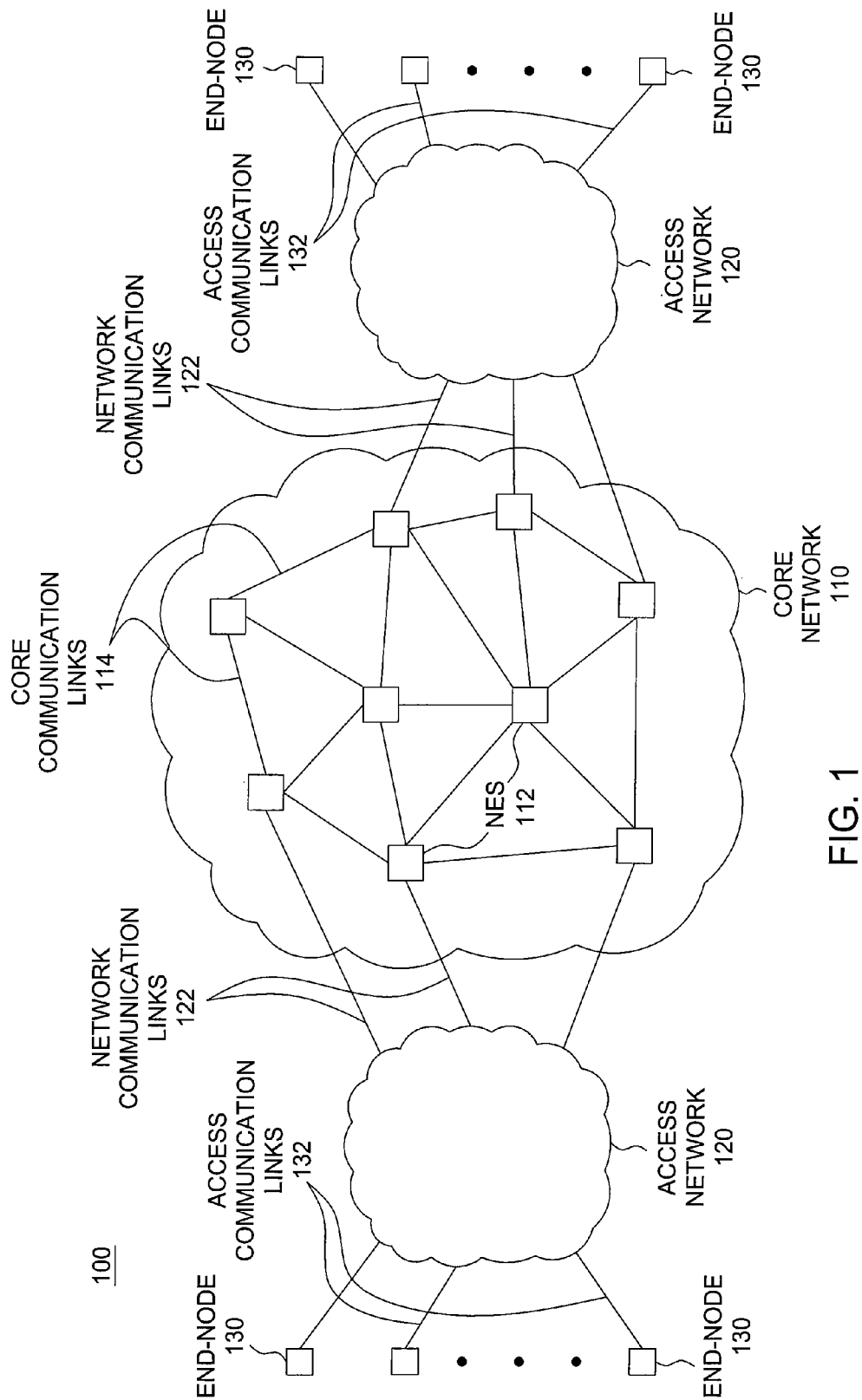
FIG. 1 depicts a high-level block diagram of a communications network architecture.

The invention is discussed in the context of a communications network architecture utilizing transmission control protocol (TCP); however, the invention can readily be applied to other networks, network topologies, and network protocols. In general, the present invention, in a system that would otherwise or normally activate a process for controlling congestion in response to a packet loss condition, prevents activation of the process for controlling congestion in response to a determination that a congestion parameter (i.e., indicator) indicates that the packet loss condition is not caused by congestion. In general, a packet loss condition includes a condition associated with a packet loss. In one embodiment, a packet loss condition may be indicative that a packet loss has occurred. Similarly, in one embodiment, a packet loss condition may include a condition which may have already caused a loss of a packet, which is likely to cause a loss of a packet, or which may potential cause a loss of a packet, such as buffer overflows, link over-utilization, bit errors, link errors, and the like. As such, a packet loss condition may include a congestion condition or a non-congestion condition.

The present invention distinguishes between packet losses due to conditions detected in the presence of congestion or caused by congestion (hereinafter referred to as congestion conditions) and packet losses due to conditions detected in the absence of congestion or not caused by congestion (hereinafter referred to as non-congestion conditions). An end-node responds in a different manner to congestion conditions and non-congestion conditions. In one embodiment, a transmitting end-node responds in a different manner to congestion conditions and non-congestion conditions. Using the present invention, a process for controlling congestion (hereinafter referred to as a congestion control mechanism) is activated in response to a condition detected in the presence of congestion and a congestion control mechanism is not activated (i.e., prevented from being activated) in response to a condition detected in the absence of congestion.

The present invention, by distinguishing between congestion conditions and non-congestion conditions, avoids triggering of unnecessary congestion control mechanisms (e.g., reducing the data rate associated with a communication path) in response to non-congestion conditions. In other words, the present invention ensures that nominal congestion control mechanisms are activated only in response to congestion conditions (i.e., not in response to non-congestion conditions). For example, by reducing a communication path transmission rate only in response to detection of a congestion condition (and not in response to detection of a non-congestion condition), the present invention thereby prevents unnecessary transmission rate reductions that would otherwise or normally be performed by TCP congestion control mechanisms in response to non-congestion conditions. As such, the present invention significantly improves network utilization, network throughput, end-to-end performance, and the like in the presence of non-congestion conditions.

Furthermore, the present invention significantly improves network utilization, network throughput, and end-to-end performance, and provides like benefits, in the presence of non-congestion conditions irrespective of various other network capabilities and conditions, such as background traffic level, background traffic burstiness, link types, link rates, link propagation delays, intermediate node capacity, intermediate node buffer size, and the like. In other words, the present invention has low sensitivity to various uncontrollable conditions, thereby rendering the present invention extremely robust. As such, the present invention significantly outperforms standard TCP versions (e.g., TCP Reno, TCP Tahoe, and the like) and like congestion control mechanisms as known in the art.

FIG. 1 depicts a high-level block diagram of a communications network architecture. Specifically, communications network architecture 100 of FIG. 1 includes a core network (CN) 110, a plurality of access networks (ANs) 120 (collectively, ANs 120), and a plurality of end-nodes (ENs) 130 (collectively, ENs 130). As depicted in FIG. 1, CN 110 includes a plurality of network elements (NEs) 112 (collectively, NEs 112) in communication using a plurality of core communication links (CCLs) 114 (collectively, CCLs 114). Although not depicted, the ANs 120 include respective pluralities of network elements and associated communication links. The ANs 120 communicate with NEs 112 using a plurality of network communication links (NCLs) 122 (collectively, NCLs 122).

The CN 110 and ANs 120 include networks operable for supporting communication paths between ENs 130 using traditional TCP/IP. For example, CN 110 includes at least one of a wireless network, an Ethernet network, an IP network, an asynchronous transfer mode (ATM) network, a frame relay (FR) network, a token-ring network, a fiber distributed data interface (FDDI) network, and like networks as known in the art. Similarly, ANs 120 include at least one of an Ethernet network, a cable network, a digital subscriber line (DSL) network, an ATM access network, a FR access network, a wireless access network, and various combinations of like access networks as known in the art.

As depicted in FIG. 1, the ENs 130 include nodes operable for establishing communication paths across various networks, for exchanging information using the communication paths, and, optionally, for presenting the exchanged information to associated end-users. For example, the ENs 130 include user devices (e.g., wireless phones, IP phones, computers, and the like), network devices (e.g., content servers, messaging servers, and the like), and like nodes as known in the art. The ENs 130 communicate with ANs 120 using a plurality of access communication links (ACLs) 132 (collectively, ACLs 132). The ACLs 132 may include wireline and wireless links. The NEs 112 of CN 110 and the network elements of ANs 120 (not depicted) operate as intermediate nodes in communication paths between ENs 130.

As depicted in FIG. 1, communications network architecture 100 of FIG. 1 is operable for supporting communication paths between ENs 130. In one embodiment, communication between ENs 130 is performed using traditional TCP/IP protocol. In general, TCP/IP includes networks operate in conjunction with a link layer, a network layer, a transport layer, and an application layer. In general, the link layer utilizes serial line IP (SLIP) protocol, point-to-point protocol (PPP), and like link layer protocols used by ENs for connecting to a network, the network layer utilizes IP and like protocols for transmitting data across and between networks (illustratively, between CN 110 and ANs 120), and the transport layer utilizes TCP, user datagram protocol (UDP), and like transport layer protocols providing fault detection, error recovery, and like end-to-end communication path functions. The application layer (spanning Open System Interconnection (OSI) session, presentation, and application layers) supports various applications, such as file transfer protocol (FTP), telecommunications network (TELNET) protocol, simple mail transfer protocol (SMTP), simple network management protocol (SNMP), trivial file transfer protocol (TFTP), and the like.

In general, traditional TCP includes a connection-oriented protocol enabling communication between various combinations of ENs (illustratively, ENs 130). For example, in one embodiment, TCP enables unidirectional communication between a pair of ENs using a forward communication path for transporting data and a reverse communication path for transporting acknowledgment information. Similarly, for example, in another embodiment, TCP enables bidirectional communication between a pair of ENs using a forward communication path for transporting data and a reverse communication path for transporting data. In one such embodiment, acknowledgment information is communicated between the pair of end nodes as a portion of the data packets transmitted on the forward communication path and the reverse communication path (e.g., using a header portion of the data packets).

In general, transport layer protocols (e.g., TCP), and like protocols, provide flow control, congestion control, error recovery, and like end-to-end functions. For example, traditional TCP includes a flow-control mechanism enabling a receiving EN to control the transmission rate of a transmitting EN for each communication path established between the transmitting EN and the receiving EN. Furthermore, traditional TCP includes a congestion control mechanism for providing reliable end-to-end communication between the transmitting EN and the receiving EN. The use of traditional TCP as a transport layer protocol, as well as use of the traditional TCP flow control mechanisms and TCP congestion control mechanisms, is well known in the art.

For example, traditional TCP reduces a congestion window size by half during a fast recovery phase and resets a congestion window size to the initial congestion window size at retransmission timeout. Similarly, traditional TCP explicit congestion notification (ECN) initiates proactive flow control measures at a transmitting end-node in response to detection of packet losses. In general, TCP ECN marks packets (rather than dropping them) when an average queue length exceeds a specific threshold value. The transmitting EN reacts to an ECN-marked packet as a packet loss and drops the congestion windows in a proactive manner. Unfortunately, however, TCP ECN and like congestion control mechanisms activate congestion control in response to both congestion conditions and non-congestion conditions.

As described herein, traditional TCP activates congestion control mechanisms in response to both congestion and non-congestion conditions. Unfortunately, as described herein, use of congestion control mechanisms in response to non-congestion conditions results in a reduction in network utilization and throughput, and negatively impacts end-to-end network performance. Thus, communications network architecture 100 of FIG. 1 utilizes a version of TCP modified according to the present invention. According to the present invention, the modified version of the TCP protocol prevents activation of congestion control mechanisms in response to non-congestion conditions, thereby enabling improved congestion control. As such, the present invention increases network throughput, improves network utilization, improves end-to-end network performance, and provides like benefits. A methodology for implementing an improved congestion control mechanism according to the present invention is depicted and described herein with respect to FIG. 2.

Figure 2:
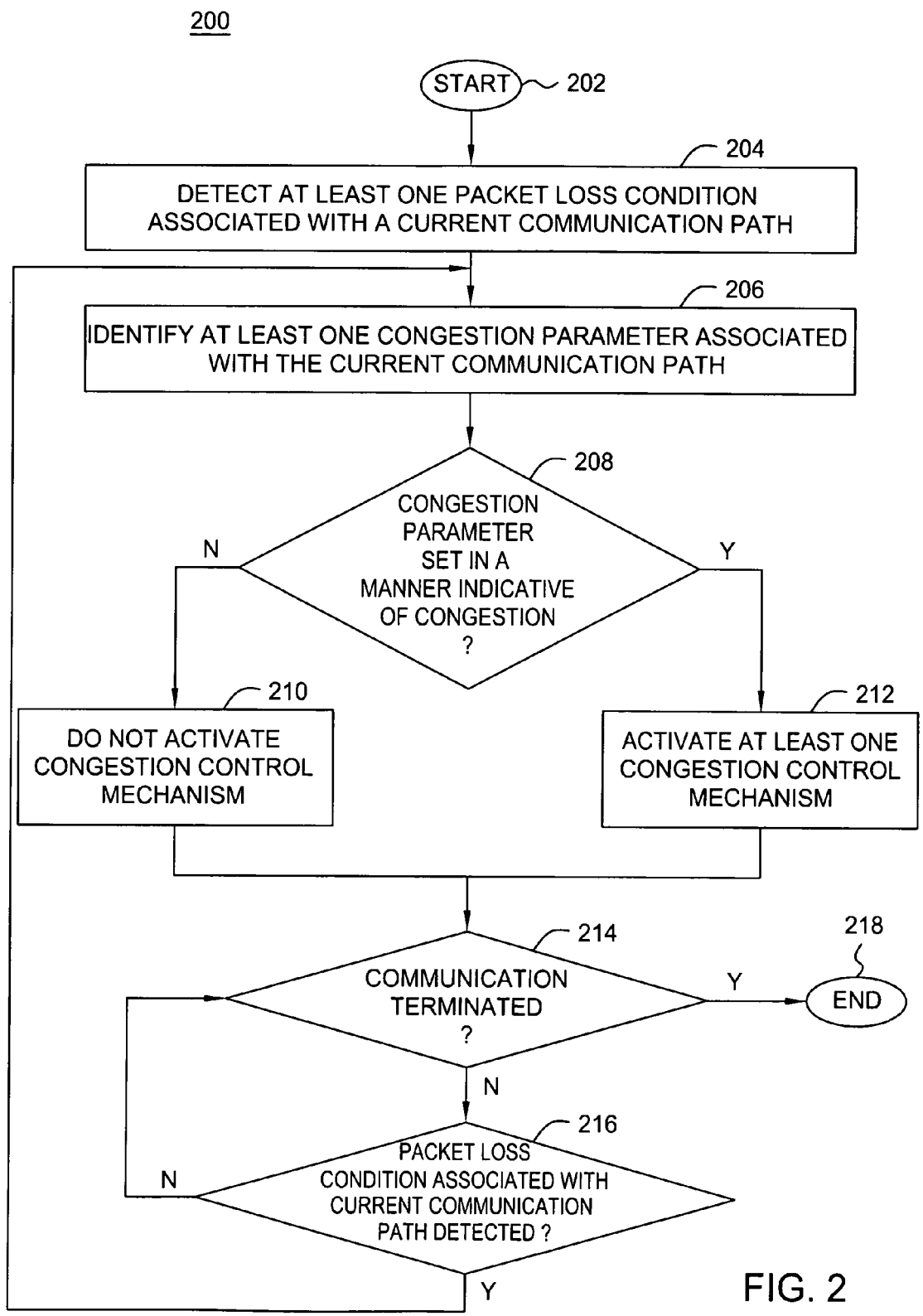
FIG. 2 depicts a flow diagram of a method according to one embodiment of the invention.

FIG. 2 depicts a flow diagram of a method according to one embodiment of the invention. Specifically, method 200 of FIG. 2 includes a method for improving congestion control. Although a portion of the steps are depicted as being performed serially, those skilled in the art will appreciate that at least a portion of the steps of method 200 may be performed contemporaneously, as well as in a different order than presented in FIG. 2. Furthermore, although described herein with respect to a unidirectional communication path, in one embodiment, the methodologies depicted and described herein with respect to FIG. 2 may be utilized for improving congestion control for bidirectional communication paths, multicast communication paths, and the like. The method 200 is entered as step 202 and proceeds to step 204.

At step 204, at least one condition associated with a communication path is detected. In one embodiment, a condition includes a packet loss condition. Since a communication path between two endpoints may change over time, in one embodiment, the identified congestion parameter is associated with a current communication path (i.e., the current route that the connection between the endpoints traverses through the network). In one embodiment, a packet loss condition associated with a communication path is detected by a transmitting EN (illustratively, one of the ENs 130). In another embodiment, a packet loss condition associated with a communication path is detected by a receiving end-node (illustratively, one of the ENs 130).

In one embodiment, a packet loss condition includes a condition indicating that at least one packet is lost. In another embodiment, a packet loss condition includes a condition that may result in the loss of at least one packet, such as a bit error, link over-utilization, and the like. For example, a packet loss condition may include an indication that at least one packet is delayed for a time greater than an associated tolerable delay threshold. In one embodiment, in which TCP provides transport layer congestion control, the a condition includes at least one of a duplicate acknowledgment (DUP ACK) condition, a retransmission timer timeout (RTT) condition, and like conditions.

At step 206, a congestion parameter associated with the communication path is identified. Since a communication path between two endpoints may change over time, in one embodiment, the identified congestion parameter is associated with a current communication path (i.e., the current route that the connection between the endpoints traverses through the network). In one embodiment, identification of a congestion parameter is performed by a transmitting EN associated with a communication path. In one embodiment, a congestion parameter associated with a communication path is stored on the transmitting EN from which the communication path originates. In one such embodiment, a congestion parameter associated with a communication path is identified by querying at least one of a memory, a database and like storage components associated with the transmitting EN.

In one embodiment, one congestion parameter is identified for a communication path. In this embodiment, only the most recent congestion parameter (e.g., the last congestion parameter value received and stored by the transmitting EN) is identified for determining whether to activate a congestion control mechanism in response to the condition detected by the transmitting EN. In another embodiment, a plurality of congestion parameters is identified for a communication path. In this embodiment, a plurality of the most recent congestion parameters (e.g., the five most recent congestion parameter values received and stored by a transmitting EN) is identified for determining whether to activate a congestion control mechanism in response to the condition detected by the transmitting EN.

In one embodiment, a congestion parameter is set by at least one intermediate node in the forward communication path between the transmitting EN and the receiving EN. In one such embodiment, the intermediate node transmits the congestion parameter to the receiving EN. The receiving EN then transmits the congestion parameter to the transmitting EN using the reverse communication path. In one embodiment, upon receiving the congestion parameter, the transmitting EN stores the congestion parameter. In one embodiment, the transmitting EN stores the most recent congestion parameter. In another embodiment, the transmitting EN stores a plurality of congestion parameters (e.g., the five most recent congestion parameters).

At step 208, a determination is made as to whether the congestion parameter is set in a manner indicative of congestion. In one such embodiment, a determination is made as to whether a state of the congestion parameter is set in a manner indicative of congestion. In one embodiment, for example, in which the most recent congestion parameter (e.g., the most recently received congestion parameter bit) is used to determine the presence of congestion, a congestion parameter bit equal to "0" is indicative of a non-congestion state (i.e., no congestion) and a congestion parameter bit equal to "1" is indicative of a congestion state (i.e., congestion). The congestion parameter bits are alternatively "1" for non-congestion and "0" for congestion.

In another embodiment, for example, in which the five most recent congestion parameters (e.g., the five most recently received congestion bits) are used to determine the presence of congestion, a congestion parameter bit sequence of "0,0,1,0,0" may be indicative of a non-congestion state (i.e., no congestion) and a congestion parameter bit sequence of "1,0,1,1,1" may be indicative of a congestion state (i.e., congestion). If the congestion parameter is set in a manner indicative of no congestion (i.e., a non-congestion state), method 200 proceeds to step 210. If the congestion parameter is set in a manner indicative of congestion (i.e., a congestion state), method 200 proceeds to step 212.

At step 210, a congestion control mechanism is not activated. In this embodiment, since the congestion parameter associated with the communication path includes a non-congestion state, an assumption is made that the at least one detected network condition is caused by at least one non-congestion condition (e.g., at least one bit error, at least one link error, and the like). As such, since the at least one detected network condition resulted from a non-congestion condition, activation of a congestion control mechanism is prevented. In one embodiment, in which TCP modified according to the present invention is utilized for transport layer congestion control, activation of standard TCP congestion control mechanisms (e.g., such as fast recovery, fast retransmit, and the like) is prevented.

At step 212, at least one congestion control mechanism (i.e., at least one process for controlling congestion) is activated. In this embodiment, since the congestion parameter associated with the communication path is indicative of a congestion state (i.e., of a presence of congestion), an assumption is made that the at least one detected network condition is caused by at least one congestion condition. As such, since the at least one condition resulted from a congestion condition, at least one congestion control mechanism is activated in order to control the congestion.

In one embodiment, a congestion control mechanism comprises one of: a window-based process for controlling congestion, a rate-based process for controlling congestion, and like congestion control processes. For example, a fast retransmit algorithm, a fast recovery algorithm, a combination of the fast retransmit algorithm and the fast recovery algorithm, and like congestion control mechanisms as known in the art may be activated. In one embodiment, a congestion control mechanism reduces a transmission rate associated with a communication path. In one embodiment, reduction of a transmission rate associated with the communication path is temporary (e.g., for a threshold period of time in order to alleviate congestion).

At step 214, a determination is made as to whether communication associated with the communication path is terminated. If communication is not terminated, method 200 proceeds to step 216. If communication is terminated, method 200 proceeds to step 218, where the method 200 ends. At step 216, a determination is made as to whether at least one condition associated with the current communication path is detected. In one embodiment, detection of a condition is substantially similar to detection of the at least one condition as described herein with respect to step 204. If a condition is not detected, method 200 returns to step 214. If a condition is detected, method 200 returns to step 206, at which point at least one congestion parameter associated with the current communication path is identified. A method for setting a congestion parameter and communicating the congestion parameter to a transmitting EN is depicted and described herein with respect to FIG. 3.

Figure 3:
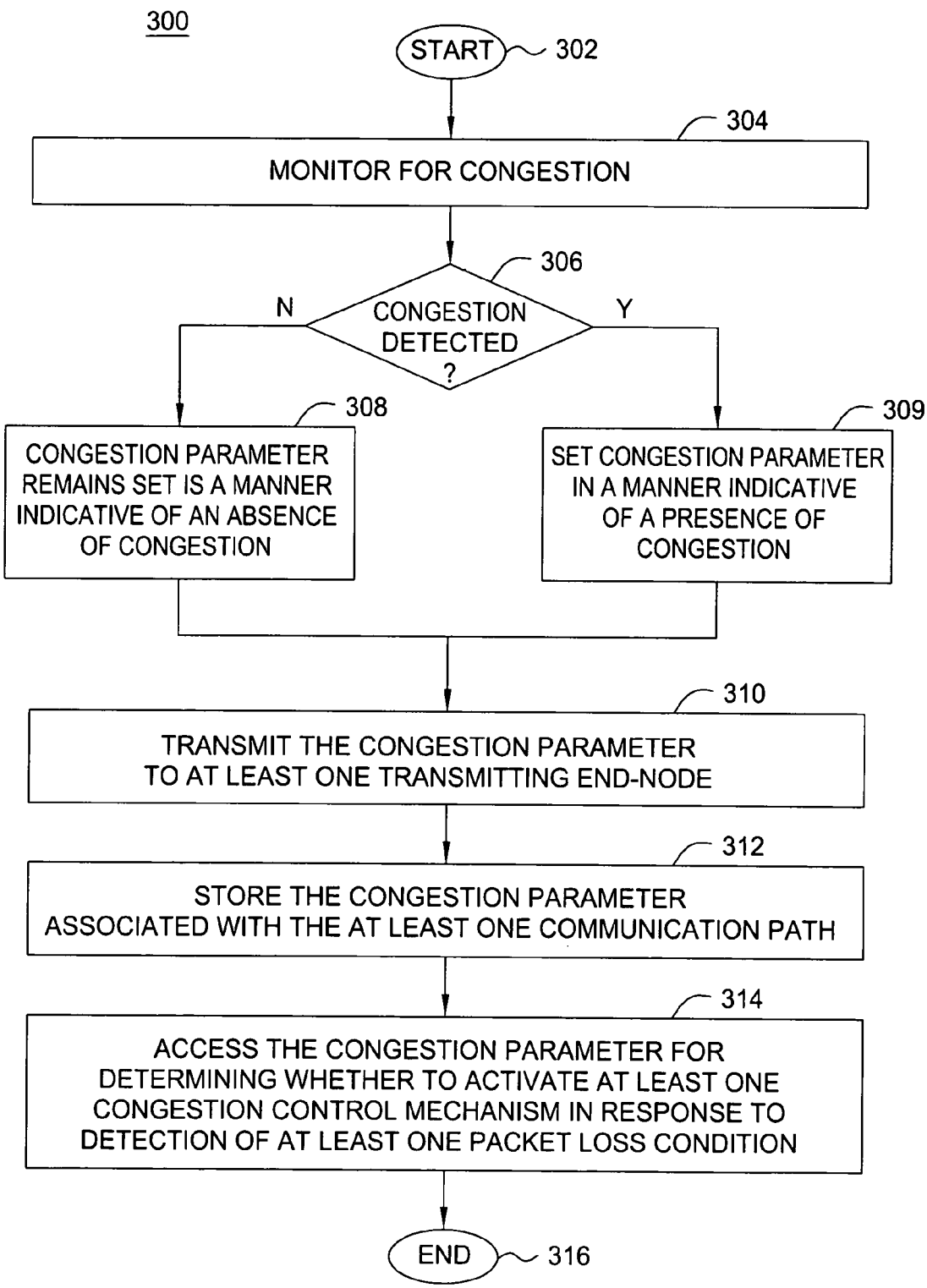
FIG. 3 depicts a flow diagram of a method according to one embodiment of the invention.

FIG. 3 depicts a flow diagram of a method according to one embodiment of the invention. Specifically, method 300 of FIG. 3 includes a method for setting a congestion parameter associated with a communication path. Although the steps are depicted as being performed serially, those skilled in the art will appreciate that at least a portion of the steps of method 300 may be performed contemporaneously, as well as in a different order than presented in FIG. 3. Furthermore, although described herein with respect to a unidirectional communication path, in one embodiment, the methodologies depicted and described herein with respect to FIG. 3 may be utilized for setting a congestion parameter for a bidirectional communication path, a multicast communication path, and the like. The method 300 is entered at step 302 and proceeds to step 304.

At step 304, a communication path is monitored for detection of congestion (i.e., a presence of congestion) associated with the communication path. In one embodiment, at least one intermediate node in the communication path monitors for congestion associated with the communication path. In one embodiment, monitoring the communication path for congestion includes monitoring a buffer utilization level associated with at least one buffer. In another embodiment, monitoring the communication path for congestion includes monitoring a link utilization level associated with at least one link. Although described herein with respect to monitoring buffer utilization and link utilization, various other measures may be used for identifying a congestion condition.

At step 306, a determination is made as to whether congestion is detected. In one embodiment, congestion is detected in response to a determination that the buffer utilization level associated with at least one buffer exceeds a buffer utilization threshold. In one embodiment, a buffer utilization level used for detecting at least one congestion condition includes at least one of an instantaneous buffer utilization level, an average buffer utilization level, and the like. In another embodiment, congestion is detected in response to a determination that a link utilization level associated with at least one link exceeds a link utilization threshold. Although described herein with respect to buffer utilization threshold and link utilization threshold, various other measures may be used to trigger setting of a congestion parameter to a value indicative of congestion.

If congestion is not detected (i.e., an absence of congestion), method 300 proceeds to step 308, where the congestion parameter associated with that communication path remains set in a manner indicative of an absence of congestion. The method 300 then proceeds to step 310. If congestion is detected, method 300 proceeds to step 309, where the congestion parameter associated with that communication path is set in a manner indicative of a presence of congestion. The method 300 then proceeds to step 310. In one embodiment, setting a congestion parameter in a manner indicative of congestion includes changing a state associated with the congestion parameter from a non-congestion state indicative of absence of congestion to a congestion state indicative of the presence of congestion.

In one embodiment, a congestion parameter is set using at least a portion of an overhead portion of at least one data packet associated with the communication path for which congestion is detected. In one embodiment, in which a congestion parameter is implemented using one bit, the congestion parameter bit is set to "1" (e.g., is changed from "0" (i.e., a non-congestion state) to "1" (i.e., a congestion state)) in response to detection of a congestion condition. As such, the congestion parameter associated with the communication path remains unset (i.e., for a congestion parameter implemented as a single overhead bit, the overhead bit remains set to "0") until at least one congestion condition is detected.

In one embodiment, in which a congestion parameter is implemented using a plurality of bits, the congestion parameter conveys additional information with respect to the communication path for which congestion is detected. In this embodiment, the congestion parameter may include a congestion characteristic. In one such embodiment, the congestion characteristic includes an available bandwidth associated with the communication path. For example, a congestion parameter includes an indication that 128 Kbps of bandwidth is available for the communication path. In another such embodiment, the congestion characteristic includes an optimum transmission rate associated with the communication path. For example, a congestion parameter includes an indication that the optimum transmission rate for the communication path is 128 Kbps.

At step 310, the congestion parameter is transmitted to the transmitting EN associated with the communication path. In one embodiment, the congestion parameter is transported using at least a portion of the overhead portion of at least one data packet traversing the forward communication path from the transmitting EN to the receiving EN. In one such embodiment, in which the communication path includes a unidirectional communication path, the congestion parameter is then communicated from the receiving EN to the transmitting EN using acknowledgment packets transmitted over the reverse communication path from the receiving EN to the transmitting EN. In another such embodiment, in which the communication path includes a bidirectional communication path, the congestion parameter is then communicated from the receiving EN to the transmitting EN using acknowledgment portions of data packets transmitted over the reverse communication path from the receiving EN to the transmitting EN.

At step 312, the congestion parameter associated with the communication path is stored. In one embodiment, a congestion parameter is stored for each communication path originating from the transmitting EN (regardless of congestion associated with each communication path). In one embodiment, the congestion parameter is stored in at least one transmitting EN associated with the at least one communication path. In one embodiment, the congestion parameter is stored in at least one of a database, a memory, and like storage components.

In one embodiment, one congestion parameter is stored for a communication path. In one such embodiment, one congestion parameter value of the one congestion parameter is stored for a communication path. In such one embodiment, for example, in which a congestion parameter is implemented using one bit, only the most recently received congestion bit is stored for each communication path. As such, upon receiving an acknowledgment packet, the transmitting EN compares the congestion bit received as a portion of the acknowledgment packet to the stored congestion bit. The stored congestion bit is replaced with the received congestion bit in response to a determination that the received congestion bit is different than the stored congestion bit.

In one such embodiment, a plurality of congestion parameter values of the one congestion parameter is stored for a communication path. In one such embodiment, for example, in which a congestion parameter is implemented using one bit, the five most recently received congestion bits are stored for each communication path. As such, upon receiving an acknowledgement packet, the transmitting EN stores the received congestion bit and deletes the stored congestion bit comprising the earliest timestamp. In other words, in one such embodiment, storage of a plurality of congestion parameters values associated with a communication path is implemented in a manner similar to a FIFO queue.

In another embodiment, a plurality of congestion parameters is stored for a communication path. In one such embodiment, for a given communication path, one congestion parameter value is stored for each of the plurality of congestion parameters associated with that communication path. In one such embodiment, for example, in which each congestion parameter is implemented using one bit, only the most recently received congestion bit is stored for each of the plurality of congestion parameters associated with that communication path. In another such embodiment, for a given communication path, a plurality of congestion parameter values is stored for each of the plurality of congestion parameters associated with that communication path. In one such embodiment, for example, in which each congestion parameter is implemented using one bit, the five most recently received congestion bits are stored for each of the plurality of congestion parameters associated with that communication path.

In one embodiment, in which a plurality of congestion parameter values is stored for a given communication path, each of the stored congestion parameter values represents an indication of congestion at a different time on the communication path (e.g., one bit represents congestion for an entire communication path at a particular time; however, a plurality of such bits are stored to provide an indication of changes in congestion of the communication path over time). For example, storage of congestion parameter values "0,1,1,1,1" provides an indication of congestion of the communication path at five different times.

In another embodiment, in which a plurality of congestion parameter values is stored for a given communication path, each of the stored congestion parameter values represents an indication of congestion at a different intermediate node in the communication path (e.g., one bit represents congestion for a portion of a communication path at a particular intermediate node; however, a plurality of such bits are stored to provide an indication of differences in congestion of the communication path over distance, i.e., between intermediate nodes traversed by the communication path). For example, storage of congestion parameter values "0,1,1,1,1" provides an indication of congestion of the communication path at five different intermediate nodes traversed by the communication path.

At step 314, the at least one congestion parameter is accessed for determining whether to activate at least one congestion control mechanism in response to detection of at least one condition. In one embodiment, a condition includes a packet loss condition. In one embodiment, accessing the at least one congestion parameter for determining whether to activate at least one congestion control mechanism in response to detection of at least one condition is performed according to the methodology depicted and described with respect to FIG. 2. The method 300 then proceeds to step 316, where the method 300 ends.

Although described herein with respect to non-congestion conditions such as bit errors, link errors, random errors, and the like, in one embodiment, a non-congestion condition may include a communication path change. For example, a communication path change includes a change to the route of a communication path through the network (e.g., traversing different intermediate nodes), a change to at least one path parameter (e.g., a path delay) associated with a communication path, and the like. As described herein, the present invention may be used for preventing activation of a congestion control mechanism in response to non-congestion conditions. As such, in one embodiment, the present invention may be used for preventing activation of a congestion control mechanism in response to a communication path change.

For example, assume that a communication path is established between mobile ENs on the ground via a low orbit satellite. This communication path may have an associated path delay of approximately one millisecond. In continuation of this example, assume that the original communication path between the ENs traversing the low orbit satellite changes to a communication path between the ENs traversing a geosynchronous satellite (i.e., at a significantly higher altitude than the low orbit satellite). This communication path may have an associated path delay of approximately a few hundred milliseconds.

Since the communication path length between the ENs has significantly increased, there is a corresponding increase in the path delay of the communication path (e.g., from one millisecond to a few hundred milliseconds). Using TCP, the RTTs associated with the original communication path traversing the low orbit satellite are set aggressively. As such, the aggressively set RTTs (configured by TCP according to the lower path delay) are triggered by the path delay increase that occurs in response to the communication path change (i.e., the change of the communication path from traversing the airplane to traversing the satellite). As such, despite a lack of network congestion there is an increase in the number of conditions detected by the transmitting EN.

Using traditional TCP (i.e., TCP not implemented according to the present invention), any large increase in RTTs (resulting from the large increase in path delay) results in scaling back of the congestion window associated with the communication path. Since, using traditional TCP, the scaling back of a congestion window is triggered in response to a non-congestion condition, the throughput of the associated communication path is negatively impacted. Using the present invention, however, the increase of RTTs alone does not result in scaling back of the congestion window associated with the communication path. In other words, the present invention prevents the scaling back of the congestion window in response to the RTTs in the absence of congestion associated with the communication path (i.e., in the absence of a congestion parameter indicative of congestion stored on the transmitting EN). As such, the present invention prevents activation of a congestion control mechanism is response to a non-congestion condition.

In one embodiment, the present invention enables optimized control of mobile ad-hoc networks. In one embodiment, the present invention enables courser timescale control. In other words, given various physical constraints at network elements (e.g., transponder capacity, processing capacity, and the like), the present invention enables maximization of network capacity irrespective of network element mobility, variable performance of point-to-point free space optical (FSO) links, and like non-congestion conditions. Similarly, the present invention enables finer timescale control. In other words, by maximizing usage of network capacity, the present invention optimizes performance provided to the application layer by the transport and network layers.

Furthermore, although primarily described herein with respect to a transport layer congestion control mechanism (i.e., TCP window-based congestion control), in one embodiment, the present invention may be used in combination with various other protocols and associated congestion control mechanisms (e.g., protocols, congestion control mechanisms, and the like associated with other layers of the OSI model). For example, the methodologies of the present invention may be used in combination with data link layer protocols (and associated data link layer congestion control mechanisms), network layer protocols (and associated network layer congestion control mechanisms), and like protocols and associated congestion control mechanisms as known in the art. As such, the methodologies of the present invention may be used for preventing activation of congestion control mechanisms in response to non-congestion conditions irrespective of network technology, network topology, and various other parameters associated with a communication path (e.g., communication path type, communication path protocols, and the like).

It is contemplated that at least a portion of the described functions may be combined into fewer functional elements. Similarly, it is contemplated that the various functions may be performed by other functional elements, and that the various functions may be distributed across the various functional elements in a different manner. For example, at least a portion of the present invention may be implemented as a portion of a transmitting EN associated with a communication path, an intermediate node associated with a communication path, a receiving EN associated with a communication path, and various other network elements associated with a communication path.

Figure 4:
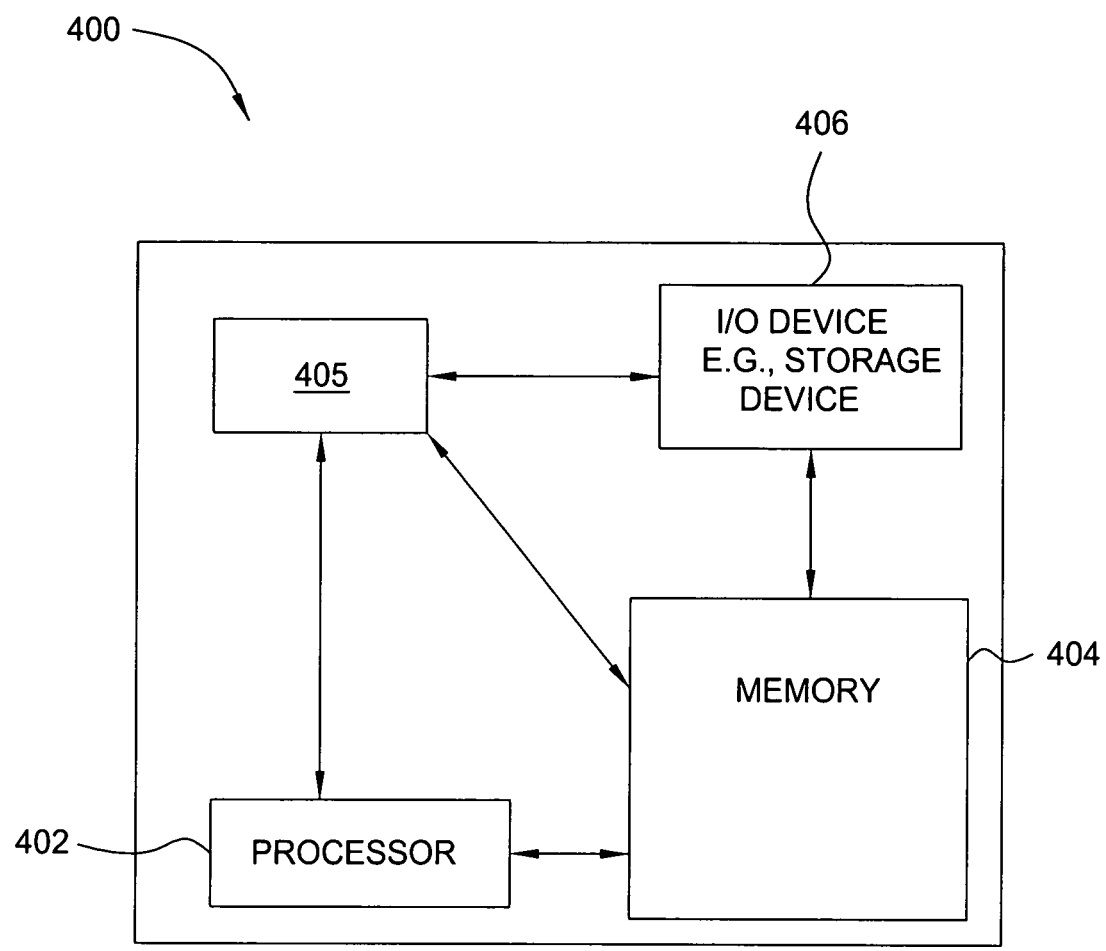
FIG. 4 depicts a high-level block diagram of a general-purpose computer suitable for use in performing the functions described herein.

FIG. 4 depicts a high level block diagram of a general purpose computer suitable for use in performing the functions described herein. As depicted in FIG. 4, system 400 includes a processor element 402 (e.g., a CPU), a memory 404, e.g., random access memory (RAM) and/or read only memory (ROM), a congestion optimization module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present congestion optimization module or process 405 can be loaded into memory 404 and executed by processor 402 to implement the functions as discussed above. As such, the congestion optimization process 405 (including associated data structures) of the present invention can be stored on a computer readable medium or carrier, e.g., RAM memory, magnetic or optical drive or diskette and the like.

Although various embodiments that incorporate the teachings of the present invention have been shown and described in detail herein, those skilled in the art can readily devise many other varied embodiments that still incorporate these teachings.

What is claimed is:

1. At a node that would otherwise activate a congestion control process in response to any packet loss condition, a method comprising the steps of:
    storing a value of a congestion parameter on the node, wherein the value of the congestion parameter indicates whether a communication path is congested or uncongested; and
    in response to detecting a packet loss condition, preventing activation of the congestion control process at the node when the value of the congestion parameter indicates that the communication path is uncongested.

2. An apparatus, comprising:
    a memory for storing a value of a congestion parameter associated with a communication path, wherein the value of the congestion parameter indicates whether the communication path is congested or uncongested; and
    a processor for preventing activation of a congestion control process in response to detecting a packet loss condition, wherein the processor prevents activation of the congestion control process when the value of the congestion parameter associated with the communication path indicates that the communication path is uncongested.

* * * * *